US012608217B2

(12) United States Patent
Lin et al.

(10) Patent No.: US 12,608,217 B2
(45) Date of Patent: Apr. 21, 2026

(54) DATA-AT-REST PROTECTION FOR VIRTUAL MACHINES

(71) Applicant: Microsoft Technology Licensing, LLC, Redmond, WA (US)

(72) Inventors: Jin Lin, Seattle, WA (US); David Alan Hepkin, Redmond, WA (US); Michael Bishop Ebersol, Woodinville, WA (US); Matthew David Kurjanowicz, Wenatchee, WA (US); Taylor Alan Hope, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 541 days.

(21) Appl. No.: 17/897,584

(22) Filed: Aug. 29, 2022

(65) Prior Publication Data

US 2024/0069943 A1 Feb. 29, 2024

(51) Int. Cl.
*G06F 9/455* (2018.01)

(52) U.S. Cl.
CPC ...... *G06F 9/45545* (2013.01); *G06F 9/45558* (2013.01); *G06F 2009/45579* (2013.01); *G06F 2009/45583* (2013.01)

(58) Field of Classification Search
CPC ............. G06F 9/45545; G06F 9/45558; G06F 2009/45579; G06F 2009/45583; G06F 2009/45587; G06F 9/45541; G06F 21/60; G06F 21/602; G06F 21/604
See application file for complete search history.

(56) References Cited

U.S. PATENT DOCUMENTS

| | | | | |
|---|---|---|---|---|
| 2014/0258716 | A1* | 9/2014 | MacMillan ............. | G06F 21/53 |
| | | | | 713/164 |
| 2016/0140343 | A1* | 5/2016 | Novak .................. | G06F 21/575 |
| | | | | 713/2 |
| 2017/0195121 | A1* | 7/2017 | Frei ....................... | H04L 9/0825 |
| 2017/0371698 | A1* | 12/2017 | Paolino .................. | H04L 49/70 |

(Continued)

OTHER PUBLICATIONS

"International Search Report and Written Opinion Issued in PCT Application No. PCT/US23/028294", Mailed Date: Sep. 21, 2023, 12 Pages.

(Continued)

*Primary Examiner* — Dong U Kim
(74) *Attorney, Agent, or Firm* — Workman Nydegger

(57) ABSTRACT

Data-at-rest protection for virtual machines includes operating a data protection component within a first privilege context of a guest partition, and operating a guest operating system (OS) within a second privilege context of the guest partition. The data protection component participates in data input/output operations of the guest OS. Based on a data output operation of the guest OS, the data protection component applies a first data protection operation to first data associated with the data output operation; and initiates storage of a first result of the first data protection operation to a data storage device. Based a data input operation of the guest OS, the data protection component applies a second data protection operation to second data associated with the data input operation; and, based on applying the second data protection operation to the second data, communicates an outcome of the data input operation to the guest OS.

20 Claims, 5 Drawing Sheets

100

(56)  References Cited

U.S. PATENT DOCUMENTS

| 2018/0212769 | A1 * | 7/2018  | Novak | G06F 21/53 |
|---|---|---|---|---|
| 2018/0314827 | A1 * | 11/2018 | Wells | G06F 9/45558 |
| 2019/0005244 | A1 * | 1/2019  | Brasher | G06F 12/145 |
| 2019/0042759 | A1 * | 2/2019  | Smith | G06F 21/602 |
| 2019/0392117 | A1 * | 12/2019 | Viswanathan | G06F 21/121 |
| 2020/0348868 | A1 * | 11/2020 | Mehra | G06F 3/0604 |
| 2020/0349260 | A1 * | 11/2020 | Ryan | G06F 9/45558 |
| 2021/0117242 | A1 * | 4/2021  | Van De Groenendaal | H04L 67/1001 |
| 2021/0117249 | A1 * | 4/2021  | Doshi | H04L 67/1001 |
| 2021/0144517 | A1 * | 5/2021  | Guim Bernat | H04L 47/781 |
| 2021/0194696 | A1 * | 6/2021  | Sahita | G06F 21/72 |
| 2022/0326975 | A1 * | 10/2022 | Chifor | H04L 9/0877 |
| 2023/0237169 | A1 * | 7/2023  | Waldspurger | G06F 9/45558 726/1 |

OTHER PUBLICATIONS

International Preliminary Report on Patentability Chapter I received for PCT Application No. PCT/US2023/028294, mailed on Mar. 13, 2025, 9 Pages.

Communication pursuant to Article 94(3) received for European Application No. 23757731.7, mailed on Jan. 16, 2026, 07 Pages.

* cited by examiner

<u>200</u>

Data Protection <u>117</u>

Key Manager <u>201</u>

I/O Interceptor <u>202</u>

Protection Operation <u>203</u>

Encryption <u>204</u>

Integrity <u>205</u>

Communication <u>206</u>

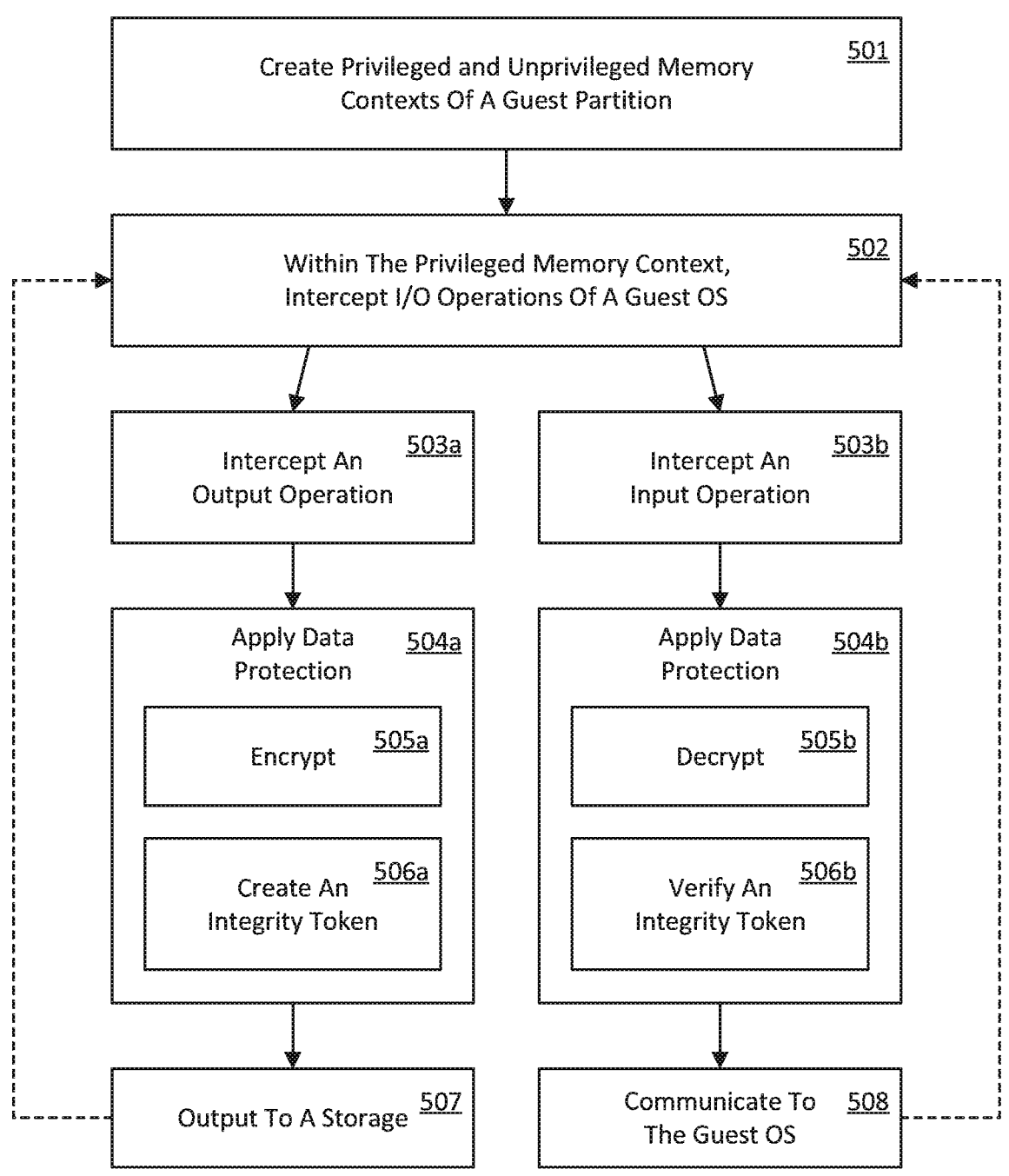

500

Create Privileged and Unprivileged Memory Contexts Of A Guest Partition          501

Within The Privileged Memory Context, Intercept I/O Operations Of A Guest OS          502

Intercept An Output Operation          503a

Intercept An Input Operation          503b

Apply Data Protection          504a

Encrypt          505a

Create An Integrity Token          506a

Apply Data Protection          504b

Decrypt          505b

Verify An Integrity Token          506b

Output To A Storage          507

Communicate To The Guest OS          508

*FIG. 5*

DATA-AT-REST PROTECTION FOR VIRTUAL MACHINES

BACKGROUND

Hypervisor-based virtualization technologies allocate portions of a computer system's physical resources (e.g., processor cores and/or time, physical memory regions, storage resources) into separate partitions, and execute software within each of those partitions. Hypervisor-based virtualization technologies therefore facilitate creation of virtual machine (VM) guests that each executes guest software, such as an operating system (OS) and other software executing therein. While hypervisor-based virtualization technologies can take a variety forms, many use an architecture comprising a hypervisor that has direct access to hardware and that operates in a separate execution environment from all other software in the system, a host partition that executes a host OS and host virtualization stack, and one or more guest partitions corresponding to VM guests. The host virtualization stack within the host partition manages guest partitions, and thus the hypervisor grants the host partition a greater level of access to the hypervisor, and to hardware resources, than it does to guest partitions.

Taking HYPER-V from MICROSOFT CORPORATION as one example, the HYPER-V hypervisor is the lowest layer of a HYPER-V stack. The HYPER-V hypervisor provides the basic functionality for dispatching and executing virtual processors for VM guests. The HYPER-V hypervisor takes ownership of hardware virtualization capabilities (e.g., second-level address translation (SLAT) processor extensions such as Rapid Virtualization Indexing from ADVANCED MICRO DEVICES, or Extended Page Table from INTEL; an input/output (I/O) memory management unit (IOMMU) that connects a direct memory access-capable I/O bus to main memory; processor virtualization controls). The HYPER-V hypervisor also provides a set of interfaces to allow a HYPER-V host stack within a host partition to leverage these virtualization capabilities to manage VM guests. The HYPER-V host stack provides general functionality for VM guest virtualization (e.g., memory management, VM guest lifecycle management, device virtualization).

In addition to isolating guest partitions from each other, some hypervisor-based virtualization technologies further operate to isolate VM guest state (e.g. registers, memory) from the host partition (and a host OS executing within), and even from an entity that manages a computing system on which the VM guests are hosted. To achieve the foregoing, these virtualization technologies introduce a security boundary between the hypervisor and the host virtualization stack. This security boundary restricts which VM guest resources can be accessed by the host OS (and, in turn, the host virtualization stack) to ensure the integrity and confidentiality of a VM guest. Such a VM guest is referred to herein as an isolated VM (IVM) guest.

While hypervisor-based virtualization technologies create guest partitions and isolate those guest partitions from each other, and potentially from a host partition, the guest OS within each guest partition is responsible for protecting its data-at-rest using disk encryption techniques. For example, a WINDOWS guest OS may protect its data-at-rest by using BITLOCKER to encrypt its system and/or data volume(s), while a LINUX guest OS may similarly protect its data-at-rest by using dm-crypt.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to methods, systems, and computer program products (computer storage media) that include: operating a data protection component within a first guest privilege context of a guest partition, the data protection component participating in data input/output operations of a guest OS operating in a second guest privilege context that is restricted from accessing memory associated with the first guest privilege context; based on the data protection component identifying a data output operation of the guest OS, the data protection component: applying a first data protection operation to first data associated with the data output operation, and initiating storage of a first result of the first data protection operation to a data storage device; and based on the data protection component identifying a data input operation of the guest OS, the data protection component: applying a second data protection operation to second data associated with the data input operation, and based on applying the second data protection operation to the second data, communicating an outcome of the data input operation to the guest OS.

In some aspects, the techniques described herein relate to methods, systems, and computer program products (computer storage media) that include: operating a data protection component within a first guest privilege context of a guest partition, the data protection component participating in data input/output operations of a guest OS operating in a second guest privilege context that is restricted from accessing memory associated with the first guest privilege context; based on the data protection component identifying a data output operation of the guest OS, the data protection component: applying an encryption operation to first data associated with the data output operation, and initiating storage of encrypted first data to a data storage device; and based on the data protection component identifying a data input operation of the guest OS, the data protection component: applying a decryption operation to second data associated with the data input operation, and communicating decrypted second data to the guest OS.

In some aspects, the techniques described herein relate to methods, systems, and computer program products (computer storage media) that include: operating a data protection component within a first guest privilege context of a guest partition, the data protection component participating in data input/output operations of a guest OS operating in a second guest privilege context that is restricted from accessing memory associated with the first guest privilege context; based on the data protection component identifying a data output operation of the guest OS, the data protection component: generating a first integrity token based on first data associated with the data output operation, and initiating storage of the first integrity token to a data storage device, and initiating storage of the first data, or a derivative of the first data, to the data storage device; and based on the data protection component identifying a data input operation of the guest OS, the data protection component: obtaining a second integrity token from the data storage device, the second integrity token being associated with second data associated with the data input operation, generating a second integrity token based on the second data, determining that the first integrity token equals the second integrity token, and based on determining that the first integrity token equals the second integrity token, communicating the second data, or a derivative of the second data, to the guest OS.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which:

FIG. 2 illustrates example functionality of a data protection component;

FIG. 5 illustrates a flow chart of an example method of data-at-rest protection for VM guests.

DETAILED DESCRIPTION

Figure 1:
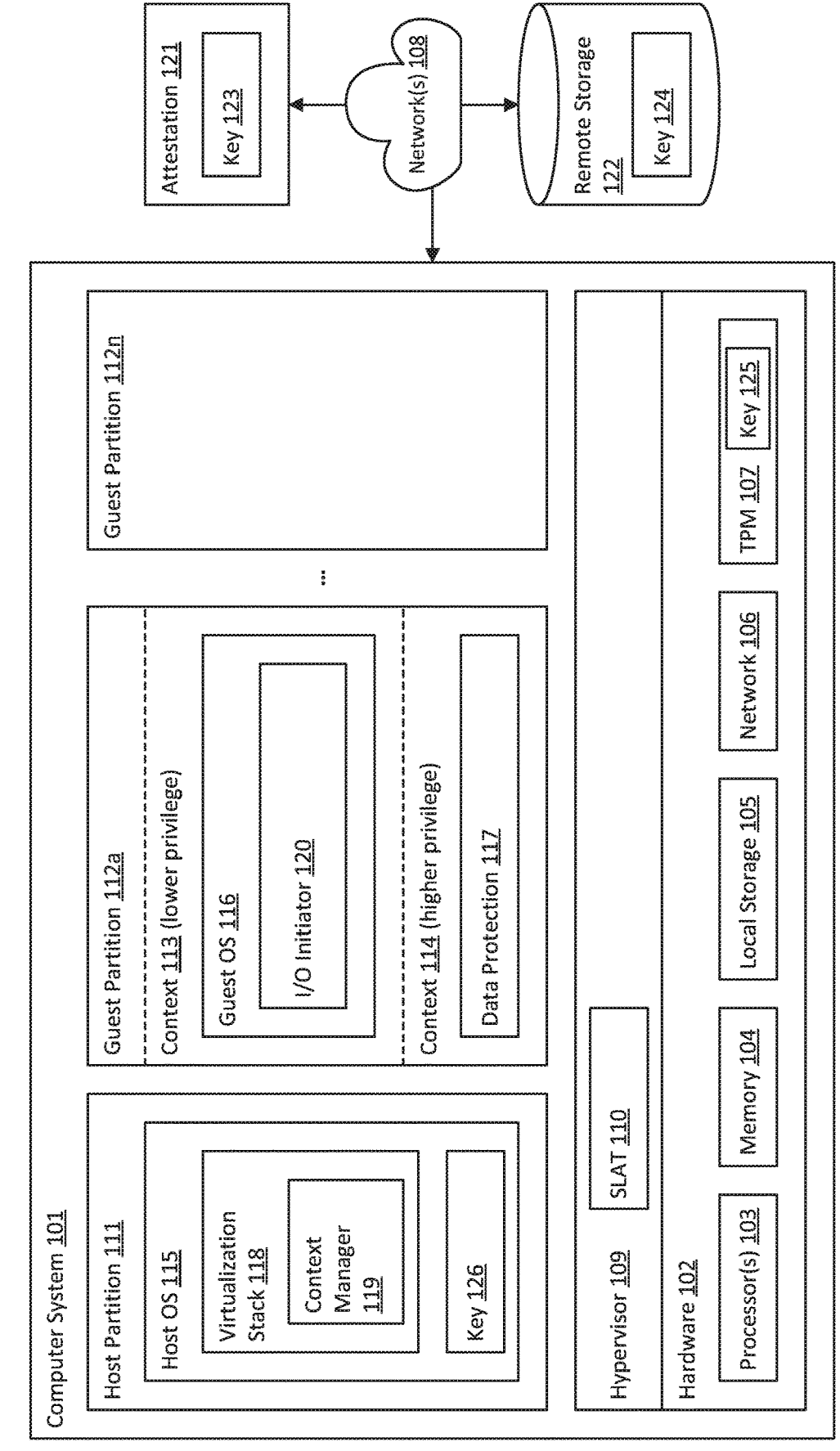
FIG. 1 illustrates an example computer architecture that facilitates data-at-rest protection for VM guests.

While guest OS's can protect a guest VM's data-at-rest using disk encryption techniques, such as BITLOCKER or dm-crypt, this protection is incomplete because these encryption techniques do not encrypt entire disks. For example, for WINDOWS VM guests, BITLOCKER does not encrypt extensible firmware interface (EFI) partitions and boot loader data on disk. Similarly, for LINUX VM guests, dm-crypt does not encrypt the kernel image and the initramfs (boot partition) on disk. Additionally, guest OS-based disk encryption techniques rely on configuration of the guest OS to set up disk encryption. This increases the amount of time it takes to set up a VM guest, relies on guest OS-specific knowledge, and is error-prone.

At least some embodiments described herein implement data-at-rest protection for VM guests. These embodiments create isolated memory contexts within a guest partition, which may include a lower privilege context and a higher privilege context. These embodiments then execute a guest OS in one of these contexts (e.g., a lower privilege context) and execute a data protection component in another of these contexts (e.g., a higher-privileged context). The data protection component virtualizes disk I/O originating from the guest OS. Thus, when the guest OS initiates I/O operations, those operations go through the data protection component, which implements data-at-rest protections including, for example, data encryption and/or data integrity protection.

By virtualizing disk I/O in this manner, the data protection component can implement data-at-rest protections for all data written by a VM guest. Thus, for example, the data protection component can provide disk encryption for an entire disk, including the partitions (e.g., EFI, and boot-related partitions) not previously encrypted by traditional guest OS encryption. Additionally, by virtualizing disk I/O in this manner, the data protection component can implement data-at-rest protections in a manner that is entirely transparent to the guest OS. In embodiments, this means that the guest OS need not even be made aware of the data protection component, or the data protections operations it is performing. In these embodiments, the guest OS operates on "cleartext" (e.g., data free of any protective transformation, such as encryption), and the data protection component handles the data protection operations without any participation of the guest OS. This means that no configuration of the guest OS is needed (e.g., to set up disk encryption); that no guest OS enlightenments are needed; and that the guest OS does not even need to support disk encryption to take advantage of the data protections provided herein.

The embodiments herein are applicable to both conventional VM guests (e.g., VM guests that lack security boundary(s) restricting access by a host OS to VM guest resources) as well as IVM guests. Notably, IVM guests may provide data-in-use encryption to isolate guest data from other partitions, including a host partition. When combined with the data-at-rest protections described herein, an IVM guest can provide end-to-end data protection for both data-in-use and data-at-rest.

FIG. 1 illustrates an example computer architecture 100 that facilitates data-at-rest protection for VM guests. As shown, computer architecture 100 includes a computer system 101 comprising hardware 102. In FIG. 1, examples of hardware 102 includes processor(s) 103 (e.g., a single processor, or a plurality of processors), memory 104 (e.g., system or main memory), a local storage 105 (e.g., a single computer-readable storage medium, or a plurality of computer-readable storage media), a network interface 106 (e.g., one or more network interface cards) for interconnecting (via a network(s) 108) to one or more other computer systems (e.g., attestation service 121, remote storage 122), and a trusted platform module (TPM) (TPM 107) for facilitating a measured boot feature that provides a tamper-resistant log of loaded boot components. Although not shown, hardware 102 may also include other hardware devices, such as an IOMMU, video display interface(s), user input interface(s), and the like.

As shown, in computer architecture 100, a hypervisor 109 executes directly on hardware 102. In general, the hypervisor 109 partitions hardware resources (e.g., processor(s) 103; memory 104; I/O resources such as an I/O address space, disk resources, and network resources) among a host partition 111 within which a host OS 115 executes, as well as a guest partition 112a within which a guest OS 116 executes. As indicated by ellipses, the hypervisor 109 may partition hardware resources into a plurality of guest partitions 112 (e.g., guest partition 112a to guest partition 112n) that each executes a corresponding guest OS. In the description herein, the term "VM guest" is used to refer to a "guest partition" and the term "IVM guest" is used to indicate that a particular VM guest is an isolated VM guest operating in an isolated guest partition under an IVM architecture. The hypervisor 109 also enables regulated communications between partitions via a bus (e.g., a VM BUS, not shown). As shown, the host OS 115 includes a virtualization stack 118, which manages VM guest virtualization (e.g., memory management, VM guest lifecycle management, device virtualization) via one or more application program interface (API) calls to the hypervisor 109.

In computer architecture 100, the virtualization stack 118 is shown as including a context manager 119, which divides a guest partition into different privilege zones, referred to herein as guest privilege contexts. Thus, for example, guest partition 112a is shown as comprising guest privilege context 113 (hereinafter, context 113) and guest privilege context 114 (hereinafter, context 114). As used herein, privilege means an authority to perform security-relevant functions on a computer system. Thus, higher privilege means a greater ability to perform security-relevant functions on a computer system, and lower privilege means a lower ability to perform security-relevant functions on a computer system. In embodiments, the context manager 119 can divide any of guest partitions 112 into different guest privilege contexts. As indicted in FIG. 1, in some embodiments context 113 is a lower privilege context (e.g., when compared to context 114), and context 114 is a higher privilege context (e.g., when compared to context 113). In these embodiments, context 113 being lower privilege than context 114 means that context 113 cannot access guest partition memory allocated to context 114. In some embodiments, context 114 can access guest partition memory allocated to context 113. In other embodiments, context 114 lacks access guest partition memory allocated to context 113.

In some embodiments, context 113 and context 114 are created based on mappings within a SLAT 110, which comprises one or more tables that map system physical addresses (SPAs) in memory 104 to guest physical address (GPAs) seen by the guest partition 112a. In these embodiments, these mappings prevent context 113 from accessing memory allocated to context 114. In one example, the hypervisor 109 is the HYPER-V hypervisor and uses virtualization-based security (VBS) to sub-partition partitions into virtual trust levels (VTLs). In this example, context 113 operates under VBS in a higher privileged VTL, and context 114 operates under VBS in a lower privileged VTL.

In other embodiments, context 113 and context 114 are created based on nested virtualization, in which guest partition 112a operates a hypervisor that, similar to hypervisor 109, partitions resources of guest partition 112a into sub-partitions. In these embodiments, this hypervisor operating within guest partition 112a prevents context 113 from accessing memory allocated to context 114.

In FIG. 1, context 114 is shown as including a data protection component 117. In embodiments, the data protection component 117 runs in each VM that is configured by the context manager 119 for the data-at-rest protections described herein. In some embodiments, the context 114 operates as a host compatibility layer (HCL) firmware environment that provides a set of facilities, such as virtualized TPM support, to a guest OS running in context 113. In these embodiments, the data protection component 117 is part of this HCL firmware environment, provides data protection facilities.

In embodiments, the data protection component 117 virtualizes one or more I/O devices that are exposed as disks to the guest OS 116. Thus, disk I/O operations initiated by any component operating within the guest OS 116 (symbolically represented by I/O initiator 120) go through the data protection component 117. For example, the data protection component 117 exposes a disk image stored in local storage 105, on remote storage 122, or the like, as a virtualized disk to guest OS 116. Because the data protection component 117 is involved in disk I/O for guest partition 112a, the data protection component 117 can implement its own data protections (e.g., data encryption and/or data integrity protection) without needing any support from guest OS 116.

For example, encryption happens within context 114, which is "underneath" the guest OS 116; thus, the guest OS 116 can operate on cleartext, and the data protection component 117 takes care of cryptography—ensuring that storage writes by the guest OS 116 are encrypted prior to the data leaving the guest partition 112a, and that storage reads by the guest OS 116 are decrypted prior to the data being communicated to the guest OS 116. In this model, the data protection component 117 can encrypt an entire disk, including sections of the disk that contain the boot loaders, etc. Additionally, or alternatively, data integrity protections happen within context 114; thus, the guest OS 116 can transparently generate and store integrity tokens (e.g., hashes, checksums) for data written by the guest OS 116, and use those integrity tokens to verify that data when it is later read by the guest OS 116, and prior to communicating it to the guest OS 116. In this model, the data protection component 117 can provide data integrity protection for an entire disk, including sections of the disk that contain the boot loaders, etc.

Notably, when the data protection component 117 operates within a guest partition that is configured as an IVM guest, it is protected from the host OS 115, just like the guest OS running inside of the IVM guest. In embodiments, the data protection component 117 is therefore part of an IVM guest's trusted computing base (TCB), and is measured as part of the IVM guest's initial image.

FIG. 2 illustrates an example 200 of internal components of the data protection component 117 of FIG. 1. Each internal component of the data protection component 117 depicted in FIG. 2 represents various functionalities that the data protection component 117 might implement in accordance with various embodiments described herein. It will be appreciated, however, that the depicted components—including their identity and arrangement—are presented merely as an aid in describing example embodiments of the data protection component 117.

As shown, in embodiments the data protection component 117 includes a key manager 201 that manages one or more keys used for cryptographic operations, such as encryption, decryption, hashing, and the like. As illustrated in FIG. 1, the key manager 201 can obtain keys from a wide variety of sources, such as from the attestation service 121 (key 123), from the remote storage 122 (key 124), from the TPM 107 (key 125), from the host OS 115 (key 126), etc. In some embodiments, the data protection component 117 receives a key as part of VM provisioning (e.g., as part of a VM image). In some embodiments, the key manager 201 obtains a key during VM operation (e.g., such as from one of the locations just described). In some embodiments, the key manager 201 generates a key itself.

The data protection component 117 also includes an I/O interceptor 202 that intercepts I/O operations of the guest OS 116. For example, the I/O interceptor 202 exposes a disk image (e.g., stored in local storage 105 or remote storage 122) as a virtualized disk to guest OS 116. Then, the I/O interceptor 202 intercepts and identifies input (read) operations and output (write) operations initiated by the guest OS 116 to this virtualized disk.

The data protection component 117 also includes a protection operation component 203 that applies one or more data protection operations to data associated with I/O operations identified by the I/O interceptor 202. As shown, in embodiments, the data protection component 117 includes one or more of an encryption component 204 and an integrity component 205. Thus, in embodiments, the protection operation component 203 applies encryption and/or data integrity protection operations to data associated with I/O operations identified by the I/O interceptor 202.

The data protection component 117 also includes a communication component 206 that communicates an outcome of a data protection operation by the protection operation component 203. In embodiments, for a data output operation, the communication component 206 initiates storage of appropriate data (e.g., the data associated with the output operation, an encrypted form of that data, and/or an integrity token) to a storage device. In embodiments, a data input operation, the communication component 206 initiates communication appropriate data (e.g., the data associated with the input operation, or a decrypted from of that data), or a fault, to the guest OS 116.

Figure 3A:
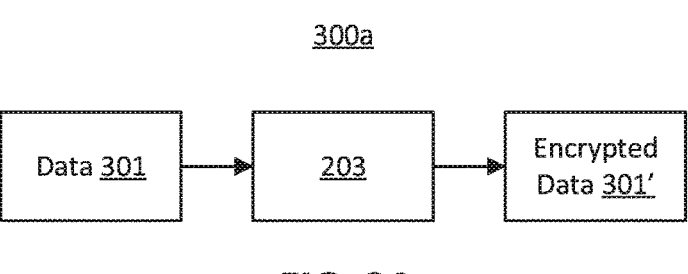
FIGS. 3A-3C illustrate examples of protection of data associated with intercepted data output operations.
Figure 3B:
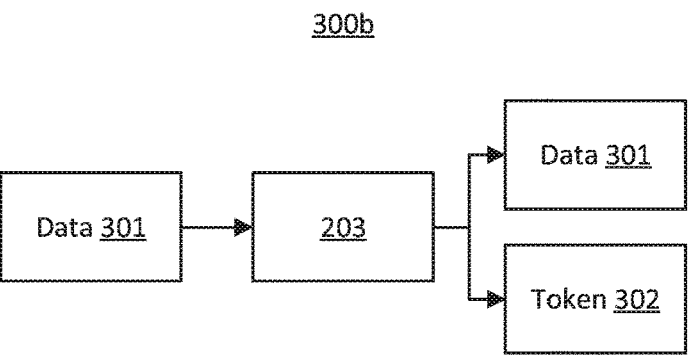
Figure 3C:
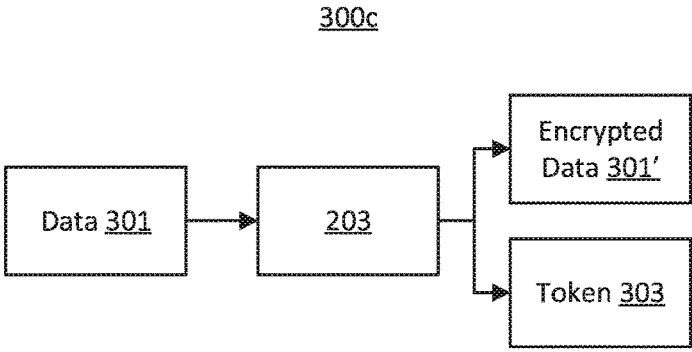

FIGS. 3A-3C illustrate examples of protection of data associated with intercepted data output operations. Initially, FIG. 3A illustrates an example 300a of encryption of data associated with an intercepted data output operation. In example 300a, the protection operation component 203 inputs data 301 and encrypts that data using the encryption component 204 (together with a key managed by the key manager 201), resulting in encrypted data 301' that the communication component 206 writes to storage (e.g., local storage 105, remote storage 122).

FIG. 3B illustrates an example 300b of generating an integrity token for data associated with an intercepted data output operation. In example 300b, the protection operation component 203 inputs data 301 and generates an integrity token from data 301 using the integrity component 205 (potentially using a key managed by the key manager 201), resulting in the data 301 and a token 302 uniquely representing that data 301, both of which the communication component 206 writes to storage (e.g., local storage 105, remote storage 122).

Combining encryption and data integrity protection, FIG. 3C illustrates an example 300c of encryption of, and generating an integrity token for, data associated with an intercepted data output operation. In example 300c, the protection operation component 203 inputs data 301 and encrypts that data using the encryption component 204 (together with a key managed by the key manager 201), resulting in encrypted data 301' that the communication component 206 writes to storage (e.g., local storage 105, remote storage 122). In example 300c, the protection operation component 203 also generates an integrity token based on data 301 using the integrity component 205 (potentially using a key managed by the key manager 201), resulting in a token 303 that the communication component 206 writes to storage (e.g., local storage 105, remote storage 122). Notably, when generating an integrity token based on data 301, the integrity component 205 may generate the integrity token using data 301 itself (such that the token 303 uniquely represents data 301), or may generate the integrity token using encrypted data 301' (such that the token 303 uniquely represents encrypted data 301').

Figure 4A:
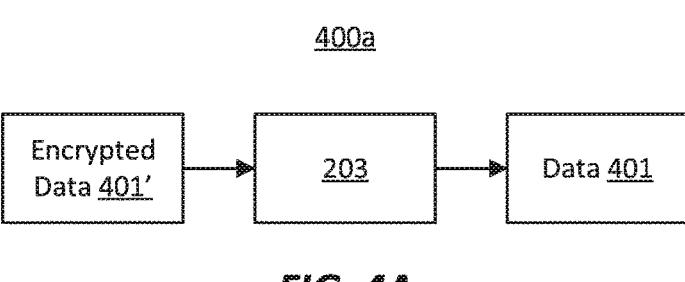
FIGS. 4A-4C illustrate examples of protection of data associated with intercepted data input operations.
Figure 4B:
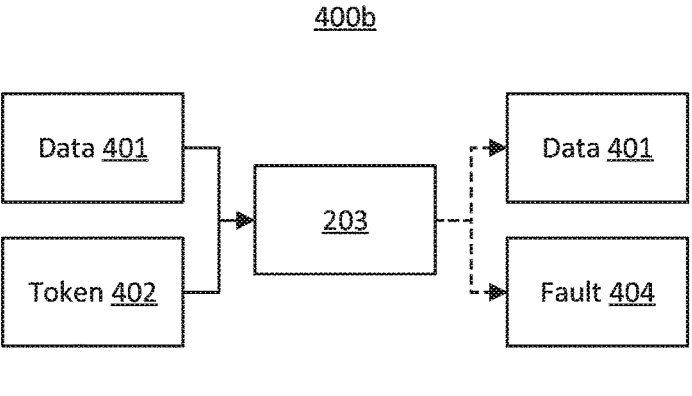
Figure 4C:
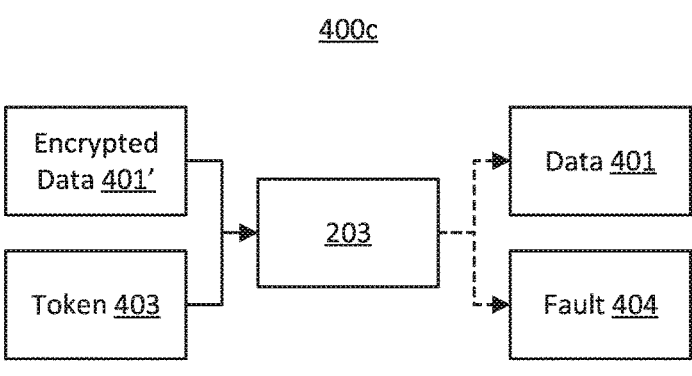

FIGS. 4A-4C illustrate examples of protection of data associated with intercepted data input operations. Initially, FIG. 4A illustrates an example 400a of decryption of data associated with an intercepted data input operation. In example 400a, the protection operation component 203 inputs encrypted data 401' and decrypts that data using the encryption component 204 (together with a key managed by the key manager 201), resulting in data 401 that the communication component 206 communicates to the guest OS 116. Referring to example 300a, in one example, encrypted data 401' equals encrypted data 301', and data 401 equals data 301.

FIG. 4B illustrates an example 400b of integrity protection of data associated with an intercepted data input operation. In example 400b, the protection operation component 203 inputs data 401 and a token 402, and uses the integrity component 205 (potentially using a key managed by the key manager 201) to determine if token 402 represents data 401. In an example, the integrity component 205 generates a new token for data 401, and compares that new token to token 402. If these tokens are equal, the integrity component 205 determines that token 402 represents data 401 and that an integrity test has passed; if these tokens are not equal, the integrity component 205 determines that token 402 does not represent data 401 and that the integrity test has failed. If the integrity test passes, the communication component 206 communicates data 401 to the guest OS 116; If the integrity test fails, the communication component 206 communicates a fault 404 (e.g., a read fault, an I/O fault) to the guest OS 116. Referring to example 300b, in one example, data 401 equals data 301, and token 402 equals token 302.

Combining encryption and data integrity protection, FIG. 4C illustrates an example 400c of decryption of, and integrity protection of, data associated with an intercepted data input operation. In example 400c, the protection operation component 203 inputs encrypted data 401' and decrypts that data using the encryption component 204 (together with a key managed by the key manager 201), resulting in data 401. In example 400c, the protection operation component 203 also uses the integrity component 205 (potentially using a key managed by the key manager 201) to determine if token 403 is associated with encrypted data 401'. In one example (e.g., when token 303 is generated from encrypted data 301' in example 300c), the integrity component 205 verifies the integrity of encrypted data 401'. Thus, the integrity component 205 generates a new token for encrypted data 401', and compares that new token to token 403. If these tokens are equal, the integrity component 205 determines that token 403 represents encrypted data 401' and that an integrity test has passed; if these tokens are not equal, the integrity component 205 determines that token 403 does not represent encrypted data 401' and that the integrity test has failed. In another example (e.g., when token 303 is generated from data 301 in example 300c), the integrity component 205 verifies the integrity of data 401. Thus, the integrity component 205 generates a new token for data 401, and compares that new token to token 403. If these tokens are equal, the integrity component 205 determines that token 403 represents data 401 and that an integrity test has passed; if these tokens are not equal, the integrity component 205 determines that token 403 does not represent data 401 and that the integrity test has failed. Either way, if the integrity test passes, the communication component 206 communicates data 401 to the guest OS 116; if the integrity test fails, the communication component 206 communicates a fault 404 (e.g., a read fault, an I/O fault) to the guest OS 116. Referring to example 300c, in one example, encrypted data 401' equals data 401, and token 403 equals token 303.

Notably, the data protection component 117 can support a variety of VM guest provisioning flows. In one VM guest provisioning flow, a VM guest is initially provisioned with an unencrypted disk image. Then, during VM guest operation, the data protection component 117 encrypts the data on that disk image. In embodiments, this encryption is performed passively (e.g., encrypting blocks when those block are written), or actively (e.g., starting at the first block and proceeding to the last block). In another VM guest provisioning flow, a VM guest is initially provisioned with a disk image that is already encrypted and is supplied with a key to decrypt the disk image.

Embodiments are now described in connection with FIG. 5, which illustrates a flow chart of an example method 500 of data-at-rest protection for VM guests. In embodiments, instructions for implementing method 500 are encoded as computer-executable instructions (e.g., context manager 119, data protection component 117) stored on a computer storage media (e.g., local storage 105) that are executable by a processor (e.g., processor(s) 103) to cause a computer system (e.g., computer system 101) to perform method 500.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 5, in some embodiments, method 500 comprises an act 501 of creating privileged and unprivileged memory contexts of a guest partition. In some embodiments, act 501 comprises creating a first guest privilege context and a second guest privilege context of a guest partition, the second guest privilege context being restricted from accessing memory associated with the first guest privilege context. In some embodiments of act 501, these contexts are created based on SLAT. In other embodiments of act 501, these contexts are created based on nested virtualization. In an example, the context manager 119 partitions guest partition 112a into context 113 and context 114, with context 113 being restricted from accessing memory associated with context 114. This enables the data protection component 117 to operate within context 114 separate from the guest OS 116 (which operates context 113). In some embodiments, this means that the guest OS 116 is unaware of context 114, and the data protection component 117 operating therein. Thus, in some embodiments of act 501, that the guest OS is unaware of the first guest privilege context.

In some embodiments, the guest partition configured as an IVM guest that is isolated from a host partition. In these embodiments, a memory region associated with the guest partition is inaccessible to a host OS.

Method 500 comprises an act 502 of, within the privileged memory context, intercepting I/O operations of a guest OS. In some embodiments, act 502 comprises operating a data protection component within the first guest privilege context, the data protection component participating in data I/O operations of a guest OS operating in the second guest privilege context. In an example, using the I/O interceptor 202, the data protection component 117 intercepts I/O operations of the guest OS 116. For example, in act 503a the data protection component 117 intercepts an output I/O operation by the guest OS 116, and in act 503b the data protection component 117 intercepts an input I/O operation by the guest OS 116. This enables the data protection component 117 to transparently apply data protection operations (e.g., encryption and data integrity protection) to data reads and data writes by the guest OS 116.

With respect to intercepting data writes, based on intercepting an I/O operation in act 502, in embodiments, method 500 comprises an act 503a of intercepting an output operation. In some embodiments, act 503a comprises identifying a data output operation of the guest OS. In an example, the I/O interceptor 202 intercepts, and identifies, a write I/O operation by an I/O initiator 120 (e.g., OS component, application, etc.) operating within guest OS 116.

After act 503a, method 500 comprises an act 504a of applying data protection. In some embodiments, act 504a comprises, based on the data protection component identifying the data output operation of the guest OS, the data protection component applying a first data protection operation to first data associated with the data output operation. In an example, the protection operation component 203 applies a data protection operation to data associated with an intercepted data write initiated by I/O initiator 120. This means that data written by the guest OS 116, or an application executing therein, is protected prior to leaving guest partition 112a.

In some embodiments, the data protection operation is encryption. Thus, as shown, in some embodiments act 504a includes an act 505a of encrypting. In some embodiments, act 505a comprises applying an encryption operation to first data associated with the data output operation. For instance, FIGS. 3A and 3C illustrated examples in which the encryption component 204 encrypts data 301 associated with an output I/O operation to generate encrypted data 301'. This means that data 301 is transparently encrypted prior to that data leaving guest partition 112a.

Additionally, or alternatively, in some embodiments, the data protection operation is integrity protection. Thus, in addition to, or as an alternative to, act 505a, in some embodiments act 504a includes an act an act 506a of creating an integrity token. In some embodiments, act 506a comprises generating a first integrity token based on first data associated with the data output operation. For instance, FIGS. 3B and 3C illustrated examples in which the integrity component 205 generates a token (e.g., token 302, token 303) based on data 301 associated with an output I/O operation. This means that integrity verification data is transparently generated for data 301 in connection with that data leaving guest partition 112a.

After act 504a, method 500 comprises an act 507 of outputting to a storage. In some embodiments, act 507 comprises the data protection component initiating storage of a first result of the first data protection operation to a data storage device. In an example, the communication component 206 initiates storage of appropriate data to a storage device (e.g., local storage 105, remote storage 122).

In embodiments, when act 504a includes act 505a, act 507 comprises initiating storage of encrypted first data to a data storage device. For example, in the context of FIGS. 3A and 3C, act 507 comprises initiating storage of encrypted data 301' to a storage device.

In embodiments, when act 504a includes act 506a, act 507 comprises initiating storage of the first integrity token to a data storage device; and initiating storage of the first data, or a derivative of the first data, to the data storage device. For example, in the context of FIG. 3B (e.g., act 504a includes act 506a but not act 505a), act 507 comprises initiating storage of token 302 and data 301 to a storage device. In another example, in the context of FIG. 3C (e.g., act 504a includes each of act 505a and act 506a), act 507 comprises initiating storage of token 303 and encrypted data 301' to a storage device.

As indicated by an arrow extending from act 507, in embodiments, method 500 returns to act 502 to intercept another I/O operation.

With respect to intercepting data reads, based on intercepting an I/O operation in act 502, in embodiments, method 500 comprises an act 503b of intercepting an input operation. In some embodiments, act 503b comprises identifying a data input operation of the guest OS. In an example, the I/O interceptor 202 intercepts, and identifies, a read operation by an I/O initiator 120 (e.g., OS component, application, etc.) operating within guest OS 116.

After act 503*b*, method 500 comprises an act 504*b* of applying data protection. In some embodiments, act 504*b* comprises, based on the data protection component identifying the data input operation of the guest OS, the data protection component applying a second data protection operation to second data associated with the data input operation. In an example, the protection operation component 203 applies a data protection operation to data associated with an intercepted data read initiated by I/O initiator 120. This means that data read by the guest OS 116, or an application executing therein, is decrypted and/or its integrity is verified, prior to reaching the guest OS 116.

In some embodiments, the data protection operation is decryption. Thus, as shown, in some embodiments, act 505*b* comprises applying a decryption operation to second data associated with the data input operation. For instance, FIGS. 4A and 4C illustrated examples in which the encryption component 204 decrypts encrypted data 401' associated with an input I/O operation to generate data 401. This means that data 401 is transparently decrypted prior to that data being communicated to guest OS 116.

Additionally, or alternatively, in some embodiments, the data protection operation is integrity protection. Thus, in addition to, or as an alternative to, act 505*b*, in some embodiments act 504*b* includes an act an act 506*b* of verifying an integrity token. In some embodiments, act 506*b* comprises obtaining a second integrity token from the data storage device, the second integrity token being associated with second data associated with the data input operation, generating a second integrity token based on the second data, and determining that the first integrity token equals the second integrity token. For instance, FIGS. 4B and 4C illustrated examples in which the integrity component 205 verifies a token (e.g., token 402, token 403) based on data (e.g., data 401, encrypted data 401') associated with an input I/O operation. This means stored integrity verification data is used to transparently verify the integrity of read data prior to that data being communicated to the guest OS 116.

After act 504*b*, method 500 comprises an act 508 of communicating to the guest OS. In some embodiments, act 508 comprises, based on applying the second data protection operation to the second data, the data protection component communicating an outcome of the data input operation to the guest OS. In an example, the communication component 206 initiates communication appropriate data (e.g., the data associated with the input operation, or a decrypted from of that data), or a fault, to the guest OS 116.

In embodiments, when act 504*b* includes act 505*b*, act 508 comprises communicating decrypted second data to the guest OS. For example, in the context of FIG. 3A act 508 comprises communicating data 401 to guest OS 116.

In some embodiments, when act 504*b* includes act 506*b*, act 508 comprises, based on determining that the first integrity token equals the second integrity token, communicating the second data, or a derivative of the second data, to the guest OS. For example, in the context of FIG. 4B (e.g., act 504*b* includes act 506*b* but not act 505*b*), act 508 comprises communicating data 401 to guest OS 116. In another example, in the context of FIG. 4C (e.g., act 504*b* includes each of act 505*b* and act 506*b*), act 508 comprises communicating data 401, which is a derivative of encrypted data 401', to guest OS 116.

In other embodiments, when act 504*b* includes act 506*b*, act 508 comprises, based on determining that the first integrity token does not equal the second integrity token, communicating a fault to the guest OS. For example, in the context of FIGS. 4B and 4C, act 508 comprises communicating a fault 404 (e.g., a read fault, an I/O fault) to guest OS 116.

As indicated by an arrow extending from act 508, in embodiments, method 500 returns to act 502 to intercept another I/O operation.

In some embodiments, applying the first data protection operation to the first data in act 504*a* comprises applying an encryption operation to the first data (act 505*a*), such that the first result of the first data protection operation comprises encrypted first data. In these embodiments, applying the second data protection operation to the second data in act 504*b* comprises applying a decryption operation to the second data (act 505*b*), and communicating the outcome of the data input operation to the guest OS in act 508 comprises communicating decrypted second data to the guest OS. In some of these embodiments, the data output to storage in act 507 is the data associated with the operation intercepted in act 503*b*, such that the encrypted first data equals the second data, and the first data equals the decrypted second data.

In some embodiments, applying the first data protection operation to the first data in act 504*a* comprises generating a first integrity token based on the first data (act 506*a*), and initiating storage of the first result of the first data protection operation to the data storage device in act 507 comprises initiating storage of the first integrity token to the data storage device. Some embodiments may further comprise initiating storage of the first data to the data storage. Alternatively, in some embodiments, applying the first data protection operation to the first data in act 504*a* also comprises applying an encryption operation to the first data (act 505*a*), and in these embodiments initiating storage of the first result of the first data protection operation to the data storage device in act 507 comprises initiating storage of encrypted first data to the data storage device. In one or more embodiments, generating the first integrity token based on the first data comprises generating the first integrity token from the first data. Alternatively, in one or more embodiments, generating the first integrity token based on the first data comprises generating the first integrity token from the encrypted first data.

In some embodiments, applying the second data protection operation to the second data in act 504*b* comprises applying a data integrity validation to the second data (act 506*b*). In these embodiments, communicating the outcome of the data input operation to the guest OS in act 508 may comprise, based the data integrity validation indicating that the second data is valid, communicating the second data, or a derivative of the second data, to the guest OS. Alternatively, in these embodiments, communicating the outcome of the data input operation to the guest OS in act 508 may comprise, based the data integrity validation indicating that the second data is invalid, communicating a fault to the guest OS.

In some embodiments, applying the data integrity validation to the second data in act 504*b* comprises obtaining a first integrity token from the data storage device, the first integrity token being associated with the second data; generating a second integrity token based on the second data; and determining if the first integrity token equals the second integrity token. In these embodiments, the data integrity validation may indicate that the second data is valid when the first integrity token equals the second integrity token. Thus, in some embodiments, the first integrity token equals the second integrity token. In these embodiments, method 500 comprises, based the data integrity validation indicating that the second data is valid, communicating the second data, or the derivative of the second data, to the guest OS. Alternatively, the data integrity validation may indicate that the second data is invalid when the first integrity token differs from the second integrity token. Thus, in some embodiments, the first integrity token does not equal the second integrity token. In these embodiments, method 500 comprises, based the data integrity validation indicating that the second data is invalid, communicating the fault to the guest OS.

In embodiments, method 500 comprises obtaining an encryption key from one of a host OS (e.g., key 126), a hardware device (e.g., key 125, key 124), or an attestation service (e.g., key 123).

Embodiments of the disclosure may comprise or utilize a special-purpose or general-purpose computer system (e.g., computer system 101) that includes computer hardware, such as, for example, a processor system (e.g., processor(s) 103) and system memory (e.g., memory 104), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., local storage 105). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EE-PROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, main-frame computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented in a computer system that includes a system memory and a storage device, comprising:
creating, by a hypervisor, a first guest privilege context of a guest partition operating as a virtual machine and a second guest privilege context of the guest partition, wherein:
the second guest privilege context is restricted from accessing memory associated with the first guest privilege context; and
a guest operating system (OS) operating in the second guest privilege context is unaware of the first guest privilege context, and a data protection component executing in the first guest privilege context;
operating the data protection component within the first guest privilege context, wherein the data protection component intercepts data input/output operations of the guest OS;
based on the data protection component identifying intercepting a data output operation of the guest OS, the data protection component:
applying, within the first guest privilege context, a first data protection operation to first of data associated with the data output operation, the first data protection operation comprising at least one of an encryption operation or an integrity token generation operation, and
initiating storage of a first result of the first data protection operation to the storage device; and
based on the data protection component intercepting a data input operation of the guest OS, the data protection component:
applying, within the first guest privilege context, a second data protection operation to second data associated with the data input operation, the second data protection operation comprising at least one of a decryption operation or a data integrity validation operation, and
based on applying the second data protection operation to the second data, communicating an outcome of the data input operation to the guest OS.

2. The method of claim 1, wherein:
applying the first data protection operation to the first data associated with the data output operation comprises applying the encryption operation to the first data;
the first result of the first data protection operation comprises an encrypted first data;
applying the second data protection operation to the second data associated with the data input operation comprises applying the decryption operation to the second data; and
communicating the outcome of the data input operation to the guest OS comprises communicating a decrypted second data to the guest OS.

3. The method of claim 1, wherein:
applying the first data protection operation to the first data associated with the data output operation comprises using the integrity token generation operation to generate a first integrity token based on the first data; and
initiating storage of the first result of the first data protection operation to the storage device comprises initiating storage of the first integrity token to the storage device.

4. The method of claim 3, wherein:
applying the first data protection operation to the first data also comprises applying the encryption operation to the first data; and
initiating storage of the first result of the first data protection operation to the storage device comprises initiating storage of an encrypted first data to the storage device.

5. The method of claim 4, wherein generating the first integrity token based on the first data comprises one of:
generating the first integrity token from the first data; or
generating the first integrity token from the encrypted first data.

6. The method of claim 1, wherein:
applying the second data protection operation to the second data associated with the data input operation comprises applying the data integrity validation operation to the second data; and
communicating the outcome of the data input operation to the guest OS comprises either:
based on the data integrity validation operation indicating that the second data is valid, communicating the second data, or a derivative of the second data, to the guest OS; or
based on the data integrity validation operation indicating that the second data is invalid, communicating a fault to the guest OS.

7. The method of claim 6, wherein applying the data integrity validation operation to the second data comprises:
obtaining a first integrity token from the storage device, the first integrity token being associated with the second data;
generating a second integrity token based on the second data; and
determining if the first integrity token equals the second integrity token, wherein:
the data integrity validation operation indicates that the second data is valid when the first integrity token equals the second integrity token; or
the data integrity validation operation indicates that the second data is invalid when the first integrity token differs from the second integrity token.

8. The method of claim 7, wherein the first integrity token equals the second integrity token, and wherein the method comprises, based on the data integrity validation operation indicating that the second data is valid, communicating the second data, or the derivative of the second data, to the guest OS.

9. The method of claim 7, wherein the first integrity token does not equal the second integrity token, and wherein the method comprises, based on the data integrity validation operation indicating that the second data is invalid, communicating the fault to the guest OS.

10. The method of claim 1, wherein creating the first guest privilege context and the second guest privilege context is based on one or more of second-level address translation or nested virtualization.

11. The method of claim 1, wherein the method further comprises obtaining an encryption key from one of a host OS, a hardware device, or an attestation service.

12. The method of claim 1, wherein a memory region associated with the guest partition is inaccessible to a host OS.

13. A computer system, comprising:
a processor;
a system memory; and
a computer-readable storage medium storing instructions that are executable by the processor to a least:
create, by a hypervisor, a first guest privilege context of a guest partition operating as a virtual machine and a second guest privilege context of the guest partition, wherein:
the second guest privilege context is restricted from accessing memory associated with the first guest privilege context; and
a guest operating system (OS) operating in the second guest privilege context is unaware of the first guest privilege context, and a data protection component executing in the first guest privilege context;
operate the data protection component within the first guest privilege context, wherein the data protection component intercepts data input/output operations of the guest OS;
intercept, by the data protection component within the first guest privilege context, a data output operation of the guest OS for writing data to the computer-readable storage medium;
apply, by the data protection component within the first guest privilege context, a data protection operation to the data, the data protection operation comprising an encryption operation or an integrity token generation operation; and
initiate, by the data protection component within the first guest privilege context, storage of a result of the data protection operation to the computer-readable storage medium.

14. The computer system of claim 13, wherein:
applying the data protection operation comprises using the integrity token generation operation to generate an integrity token based on the data; and
the result of the data protection operation comprises the data, or a derivative of the data, and the integrity token.

15. The computer system of claim 13, wherein:
applying the data protection operation comprises applying the encryption operation to the data; and the result of the data protection operation comprises encrypted data.

16. A computer system, comprising:
a processor;
a system memory; and
a computer-readable storage medium storing instructions that are executable by the processor to a least:
create, by a hypervisor, a first guest privilege context of a guest partition operating as a virtual machine and a second guest privilege context of the guest partition, wherein:
the second guest privilege context is restricted from accessing memory associated with the first guest privilege context; and
a guest operating system (OS) operating in the second guest privilege context is unaware of the first guest privilege context, and a data protection component executing in the first guest privilege context;
operate the data protection component within the first guest privilege context, wherein the data protection component intercepts data input/output operations of the guest OS;
intercept, by the data protection component within the first guest privilege context, a data input operation of the guest OS for reading data from the computer-readable storage medium;
apply, by the data protection component within the first guest privilege context, a data protection operation to the data, the data protection operation comprising a decryption operation or a data integrity validation operation; and
based on applying the data protection operation to the data, communicate an outcome of the data protection operation to the guest OS.

17. The computer system of claim 16, wherein:
applying the data protection operation comprises applying the decryption operation to the data; and
an output of the data protection operation comprises decrypted data.

18. The computer system of claim 16, wherein applying the data protection operation comprises:
obtaining a first integrity token from a data storage device, the first integrity token being associated with the data;
generating an integrity token based on the data; and
determining that the first integrity token equals the integrity token, and wherein an output of the data protection operation comprises the data, or a derivative of the data.

19. The computer system of claim 16, wherein applying the data protection operation comprises:
obtaining a first integrity token from a data storage device, the first integrity token being associated with the data;
generating an integrity token based on the data; and
determining that the first integrity token does not equal the integrity token, and wherein an output of the data protection operation comprises a fault.

20. The computer system of claim 16, wherein creating the first guest privilege context and the second guest privilege context is based on one or more of second-level address translation or nested virtualization.

* * * * *